United States Patent [19]
Winkhofer et al.

[11] Patent Number: 6,093,841
[45] Date of Patent: Jul. 25, 2000

[54] METHOD FOR PREPARING NONREACTIVE AMINOSILICONE OILS

[75] Inventors: Norbert Winkhofer; Holger Rautschek; Maria Beinert, all of Neunchritz; Leonore Jentsch, Groedel, all of Germany

[73] Assignee: Degussa-Huels Aktiengesellschaft, Marl, Germany

[21] Appl. No.: 09/222,925

[22] Filed: Dec. 30, 1998

[30]    Foreign Application Priority Data

Jan. 2, 1998 [DE] Germany .......................... 198 00 024
Jun. 30, 1998 [DE] Germany .......................... 198 29 166

[51] Int. Cl.[7] ....................................................... C07F 7/10
[52] U.S. Cl. ............................................................ 556/425
[58] Field of Search ............................................... 556/425

[56]             References Cited
                 U.S. PATENT DOCUMENTS 5,077,421  12/1991  Selvig .
5,118,777   6/1992  Okawa ....................................... 528/34
5,206,337   4/1993  Takeda et al. ........................... 528/313
5,892,084   4/1999  Janeiro et al. .......................... 556/425

FOREIGN PATENT DOCUMENTS 0 269 886   6/1988   European Pat. Off. .

*Primary Examiner*—Paul F. Shaver
*Attorney, Agent, or Firm*—Oblon, Spivak, McClelland, Maier & Neustadt, P.C.

[57]              ABSTRACT

A method for preparing nonreactive aminosilicone oils by base-catalyzed equilibration, which entails reacting at least an organosilicon compound with at least one cyclic organosilicon compound in the presence of a basic catalyst in a first step; and in a second step reacting the reaction mixture produced in the first step, in the presence of water, with at least one organosilicon compound.

11 Claims, No Drawings

METHOD FOR PREPARING NONREACTIVE AMINOSILICONE OILS

BACKGROUND OF THE INVENTION

1. Field of the Invention

The present invention relates to a method for preparing nonreactive aminosilicone oils by base-catalyzed equilibration, which are used, in particular, as agents for textile treatment or in polishes.

2. Description of the Background

The preparation of aminosilicone oils has been known for some time. Typically, an aminosilane is equilibrated with a siloxane in the presence of a basic catalyst. In order to obtain nonreactive oils, this equilibration is often preceded by hydrolytic condensation of the aminosilane containing alkoxy groups. The silane in this case should either contain only one Si atom with condensable alkoxy groups, since the presence of more than one such Si atom would otherwise lead to high-viscosity or even gelled products during condensation, or else very mild condensation conditions should be used, which leads to a high Si—OH content in the end product, which in turn has unfavorable effects on storage stability.

EP 0 269 886, for example, describes a method for preparing nonreactive aminosilicone oil starting from aminosilanes that avoids the hydrolytic condensation as a preliminary step. In this case, monomeric silanes that have amino and alkoxy groups and contain only one Si atom with condensable alkoxy groups are equilibrated in a first step with a linear organopolysiloxane that contains monofunctional units (M-units), in the presence of a basic catalyst and in the absence of water, which leads to a reduction of the number of condensable alkoxy groups per molecule by the number of siloxane units incorporated. Water is then added in a second step to the reaction product obtained and the mixture is subjected to a hydrolysis/condensation reaction to remove the reactive alkoxy groups. The end product obtained in this way can then, if needed, be finally subjected again in a third step to base-catalyzed equilibration with organopolysiloxanes, to adjust to the desired viscosity and/or the desired amine content. The amino groups are statistically distributed in the end product.

Unfortunately, the method of EP 0 269 886 has the particular drawback that the first step must be carried out under anhydrous conditions, which can be accomplished industrially only with difficulty.

Thus, a need exists for a method of preparing nonreactive aminosilane oils which overcomes the above disadvantages.

SUMMARY OF THE INVENTION

Accordingly, it is an object of the present invention to provide a method for preparing nonreactive aminosilicone oils by base-catalyzed condensation that avoids hydrolytic condensation as a preliminary step, but by contrast may be effected in the presence of water, and nevertheless also allows dimeric aminosilanes that have two Si atoms with condensable alkoxy groups to be used as starting material, along with the monomeric aminosilanes.

The above object and others are provided by a method for preparing nonreactive aminosilicone oils by base-catalyzed condensation, which entails (a) reacting in a first step, at least one organosilicon compound of the formula (I):

$$(R)_a(R^1O)_{3-a}\text{—Si—}(CR^2{}_2)_m\text{—}NR^3\text{—}(CR^2{}_2)_p\text{—}NR^3{}_2 \quad (I)$$

wherein R independently of one another represents univalent, saturated and/or unsaturated hydrocarbon groups with 1 to about 20 carbon atoms or aryl groups with about 6 to 20 carbon atoms, $R^1$ independently of one another represents univalent alkyl groups with 1 to about 4 carbon atoms, $R^2$ independently of one another represents saturated and/or unsaturated, substituted and/or unsubstituted, linear and/or cyclic hydrocarbon groups with 1 to about 30 carbon atoms or hydrogen, $R^3$ independently of one another represents alkyl, cycloalkyl, and/or aryl groups with 1 to about 20 carbon atoms or $(R^1O)_a(R^2)_{3-a}\text{—Si—}(CR^2{}_2)_m\text{—}$ groups, a represents either 0 or 1, and m and n independently of one another have a value of 1 to 10, and p is either 0, 1, or 2, or the partial hydrolyzate thereof, or both, with at least one cyclic organosilicon compound of the formula (II):

wherein R is as defined above and x has an average value of between 3 and 10, in the presence of a basic catalyst, and in the presence of at least one compound having OH groups, with a maximum total fraction of OH groups in the first step being about 75 mol-% based on the $(R^1O)$ groups contained in the formula (I), and b) reacting, in a second step, the reaction mixture obtained from step a) in the presence of water with at least one organosilicon compound of the formula (III):

wherein R is as defined above and z has an average value of between 0 and about 1,000.

DETAILED DESCRIPTION OF THE PREFERRED EMBODIMENTS

In accordance with the present invention at least one organosilicon compound of the formula (I):

wherein R, $R^1$, $R^2$, $R^3$, a, m, n and p are as defined above, is reacted with at least one cyclic organosilicon compound of the formula (II):

wherein R and x are as defined above, in the presence of a basic catalyst and in the presence of at least are compound having OH groups as defined above in a first step. Then, in a second step, the reaction mixture obtained from the first step is reacted, in the presence of water, with at least one organosilicon compound of the formula (III).

wherein R and Z are as defined above.

As the organosilicon compound of the formula (I), it is preferred to use a compound having the formula (IV):

or the compound with the formula (V):

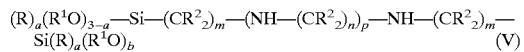

or mixtures thereof. Especially used are mixtures as they are obtained in industrial production, consisting of about 50 to 97 wt. % of the compound with the general formula (IV) and 3 to 50 wt. % of the compound with the general formula (V).

Particular examples of compounds having the formula (I) which may be mentioned are:

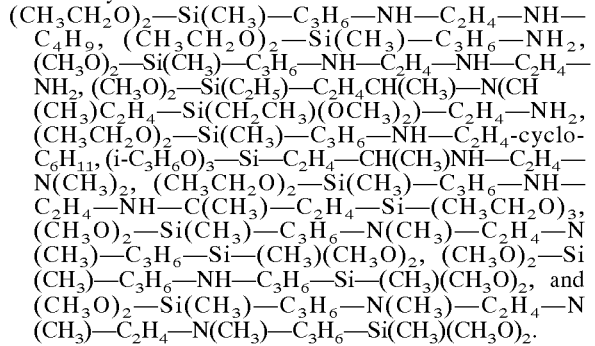

Preferably used compounds having the formula (IV) are:

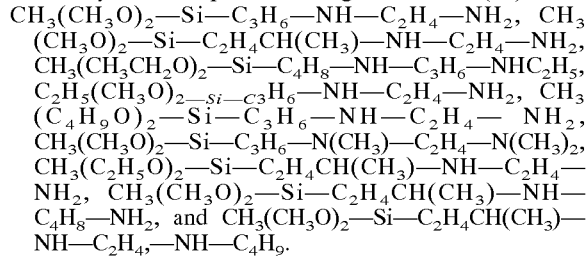

Preferably used compounds having the formula (V) are:

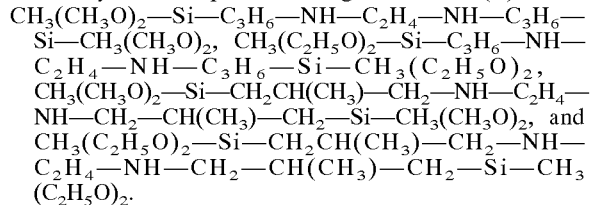

Methyl groups are preferred as groups R in the formula (I). However, R can also represent the following groups: n-alkyl groups with 2 to about 20 carbon atoms such as ethyl or hexyl groups, for example, cyclohexyl groups, iso-alkyl groups with 3 to about 20 carbon atoms such as isopropyl and isoamyl groups, alkyl groups with tertiary carbon atoms such as tert-butyl and tert-pentyl groups, unsaturated hydrocarbon groups such as allyl or vinyl, aromatic hydrocarbon groups such as phenyl, naphthyl, or anthryl groups, for example, alkylaryl groups in which the silicon is bonded either to an aromatic carbon such as in the case of tolyl groups, or to an aliphatic carbon as in the case of benzyl groups, for example, and substituted hydrocarbon groups such as trifluoropropyl, cyanoethyl, alkoxyaryl, alkoxyalkyl, and haloaryl groups, for example.

Identical or different $C_{1-4}$-alkyl groups are preferred as groups $R^1$, with methyl and ethyl groups being especially preferred.

Examples of the groups $R^2$ are hydrogen or $C_{1-20}$-alkyl or aryl groups, with hydrogen and the methyl group being preferred. It is especially preferred for at least 90% of the groups $R^2$ to be hydrogen and up to 10% to be methyl.

Preferred as groups $R^3$ are: hydrogen or hydrocarbon groups, for example n-alkyl groups with 1 to about 20 carbon atoms such as methyl, ethyl, butyl, or hexyl groups, cyclohexyl groups, iso-alkyl groups with 3 to about 20 carbon atoms such as isopropyl and isoamyl groups, and alkyl groups with tertiary carbon atoms such as tert-butyl and tert-pentyl groups.

The compounds having the formula (I) may be prepared by known methods, by nucleophilic substitution reactions of silanes with haloalkyl groups with ammonia or amines. An example is the reaction of chloropropylmethyldimethoxysiloxane with ammonia, ethylenediamine, or diethylenetriamine. Depending on whether single or multiple reaction of the silane with the amine takes place (the tendency depends on the ratio of starting materials), compounds conforming to the formulas (IV) or (V) are formed. These compounds can either be used immediately in the method of the invention as mixtures, or they can be used as pure compounds after separation by distillation, or they can be used in the form of intentionally prepared mixtures.

As the cyclic organosilicon compound having the formula (II), it is preferred to use a mixture of cyclic siloxanes with the general formula (II), in which x assumes values between about 3 and 15, with the average value of x in the mixture being about 4 to 6. Also in formula (II), methyl, vinyl, and phenyl groups are preferred as the groups R, with methyl groups being especially preferred. Examples of cyclic siloxanes with the formula (II) are compounds such as hexamethylcyclotrisiloxane, octamethylcyclotetrasiloxane, decamethylcyclopentasiloxane, dodecamethylcyclohexasiloxane, tetramethyltetraphenylcyclotetrasiloxane, tetramethyltetravinylcyclotetrasiloxane, tetramethyltetraphenylcyclotetrasiloxane. These compounds are known and are obtained, for example, by hydrolysis of dialkyldichlorosilanes, where they are separated from the hydrolyzed mixture obtained. Another method for preparing compounds with the general formula (II) is the acid- or alkaline-catalyzed depolymerization of polydialkylsiloxanes.

All known compounds that catalyze equilibration reactions can be used as the basic catalyst in the first step, for example alkali metal hydroxides and/or alkaline earth hydroxides, such as lithium, sodium, potassium, cesium, calcium, and/or barium hydroxide, tetraalkylphosphonium hydroxides such as tetrabutylphosphonium hydroxide, for example, and/or tetraalkylammonium hydroxides and their silanolates and siloxanolates.

The basic catalyst is usually used in concentrations of about 0.001 to about 20 wt. %, preferably from about 0.05 to 5 wt. %, based on the reaction mixture from the first step, and can be used in the form of a solution, usually at a concentration between about 1 and 50%. Water is the preferred solvent, but alcohols such as ethanol, for example, can also be used.

The method pursuant to the invention can be executed without adding water in the first step, but it is not necessary in any case to exclude completely the presence of water. Compounds containing OH groups can be included in the first step of the method of the invention, up to a total fraction of OH groups of 75 mol-% based on the ($R^1O$) groups contained in the general formula (I), but a total amount of about 5 to 20 mol-% OH groups is preferred. Water is usually used as the compound that has OH groups. Thus, for example, the basic catalyst can be used in the form of an aqueous solution.

Oligomeric silanols and/or siloxanols such as the linear fraction of the dimethyldichlorosilane hydrolyzate, or trimethylsilanol, for example, can be used as other compounds that contain OH groups.

The amount of water that is added in the second step is about 0.1 to 50 wt. %, preferably 1 to 20 wt. %, based on the reaction mixture from the first step.

The organosilicon compound with the general formula (III) that is added in the second step is a linear, preferably trimethylsiloxy-terminated polydimethylsiloxane that consists of D-units and M-units, with a viscosity between about 0.65 and 50,000 mPas, preferably between about 50 and 500 mPas. The compounds with the general formula (III) are prepared by known methods, for example by polymerization of compounds of formula (II), with chain termination occurring by the incorporation of trialkylsiloxy groups.

An especially preferred form of embodiment consists of reacting a mixture of at least one compound with the formula (IV):

$$(R)_a(R^1O)_{3-a}—Si—(CR^2_2)_m—(NH—(CR^2_2)_n)_p—NH_2 \qquad (IV)$$

and at least one compound with the formula (V):

$$(R)_a(R^1O)_{3-a}—Si—(CR^2_2)_m—(NH—(CR^2_2)_n)_p—NH—(CR^2_2)_m—Si(R)_a(R^1O)_b \qquad (V)$$

with at least one cyclic organosilicon compound with the formula $$(R_2SiO)_x \qquad (II)$$

in the presence of a basic catalyst, and reacting the reaction mixture obtained, in a second step,
  with about 0.1 to 50 wt. % water based on the reaction mixture from the first step,
  and at least one organosilicon compound with the general formula $$R_3SiO(SiR_2)_zSiR_3 \qquad (III),$$

wherein the groups R and $R^2$ stand for methyl or ethyl groups, $R^1$ has the meanings given above, and z assumes values between about 50 and 500. In particular, the mixtures obtained from the preparation of the aminosilane, consisting of about 50 to 97 wt. % of the compound with the formula (IV) and about 3 to 50 wt. % of the compound with the formula (V), are also used here. No water is added in the first step.

Because of the use pursuant to the invention of cyclic polyorganosiloxanes, i.e. those that have only D-units, it is possible to allow a content of compounds that contain OH groups, especially an industrially feasible content, such as water in particular. The monomeric and/or dimeric silane used that has amino and alkoxy groups is equilibrated together with the siloxane containing the D-units, which leads to the number of condensable alkoxy groups per molecule actually being retained, but being physically far apart from one another. This makes it possible to operate in the presence of water even in the first step without obtaining high-viscosity or gel-like products. A defined addition of compounds containing OH groups in the first step also has the benefit of controlled initiation of the hydrolysis/condensation reaction, which is then terminated in the second step.

Water and linear polyorganosiloxane containing M-units are added in the second step to the reaction mixture obtained, while a repeated addition of basic catalyst is not actually necessary but is permissible. The reaction can be carried out in the same reaction vessel. However, it is also possible to use two different reactors. The reaction mixture is heated during the addition, with the alcohol being formed continuously and excess water being removed. After completion of the reaction, the cyclic polyorganosiloxanes formed because of the reaction equilibrium can likewise be removed, but this is not absolutely necessary.

The reaction is complete in both the first and second steps when no further viscosity change can be observed.

The end product obtained can be subjected finally in a third step, if needed, to a base-catalyzed equilibration with organopolysiloxanes to adjust it to the desired viscosity and/or the desired amine content in the aminosilicone oil, preferably about 0.001 to 1 meq/g.

It is possible by the method of the invention, especially by using the dimeric aminosilanes, to obtain end products with the formula (VI):

$$R_3Si—O—(SiR_2—O)_x(SiRR^N O)_y—(SiRQO)_z—SiR_3 \qquad (VI)$$

wherein R and $R^2$ have the meanings given above, $R^4$ stands for hydrogen or hydrocarbon groups, for example alkyl groups with 1 to about 20 carbon atoms such as methyl, ethyl, butyl, or hexyl groups, cyclohexyl groups, iso-alkyl groups with 3 to about 20 carbon atoms such as isopropyl and isoamyl groups, and alkyl groups with tertiary carbon atoms such as tert-butyl and tert-pentyl groups, and RN stands for a group with the formula $—(CR^2_2)_m—(NH—(CR^2_2)_n)_p—NH—R^4$
  and Q stands for a group with the formula $—(CR^2_2)_m—(NH—(CR^2_2)_n)_p—NH—(CR^2_2)_m—^+Si$
  or $—(CR^2_2)_m—N(—(CR^2_2)_n—NHR^4)—^+Si$
    wherein $^+Si$ represents an intermolecular or intramolecular linkage point to a molecule with the formula (VI).

The values of x, y, and z are chosen so that the amine content of the nonreactive aminosilicone oil prepared pursuant to the invention is about 0.01 to 20 meq/g, preferably about 0.05 to 10.0 meq/g [milllequivalents per g of polymer with the formula (VI)], i.e., so that 1 g of polymer consumes about 0.01 to 20 ml of 1 M hydrochloric acid in the acid/base titration, and the viscosity at 25° C. is in the range of about 20 to 1,000,000 mm²/s, preferably in the range of about 100 to 20,000 mm²/s. The value of z is either 0 or is such that on the average there is less than one linkage point per polymer molecule.

An example of two linked polymer molecules is illustrated by the formula (VII), in which Me stands for methyl and RN, for example, represents a group with the formula $—(CH_2)_3—NH—(CH_2)_2—NH_2$:

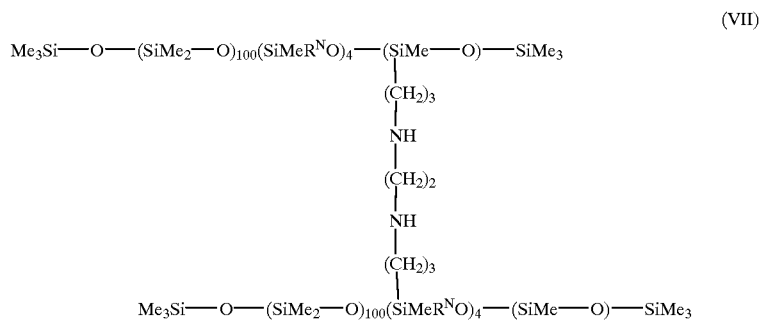

The amino groups in the nonreactive aminosilicone oils prepared according to the invention can be present entirely or partly as amide or imide group, for example after amino groups have been reacted with acetic anhydride.

It is possible with the method of the invention for preparing nonreactive aminosilicone oils by base-catalyzed condensation, to operate in the presence of compounds containing OH groups like water, and nevertheless to permit the use of dimeric aminosilanes that have two Si atoms with condensable groups as starting materials, along with the monomeric aminosilanes. The nonreactive aminosilicone oils prepared according to the invention, and/or the products prepared from them by equilibration with polydimethylsiloxanes and/or cyclic siloxanes, have extremely low contents of Si—OH groups, they are stable in storage, and they can be used successfully, among other uses, as release agents, soft-hand textile auxiliaries, ingredients for polishes and cosmetic preparations, and for the preparation of defoaming agents. Their use in the form of aqueous emulsions is preferred.

The present invention will now be further described by reference to certain examples which are provided solely for purposes of illustration and are not intended to be limitative.

EXAMPLE 1

682 parts by weight of a mixture of cyclic siloxanes with an average of 4 to 5 dimethylsiloxane units, 38 parts by weight of a silane with the formula $CH_3(CH_3O)_2$—Si—$C_3H_6$—$NHC_2H_4$—$NH_2$, and 4 parts by weight of a silane with the formula $CH_3(CH_3O)_2$—Si—$C_3H_6$—$NHC_2H_4$—NH—$C_3H_6$—Si—$(CH_3O)_2$—$CH_3$ was mixed with 0.9 parts by weight of KOH and 2.7 parts by weight of water and heated with stirring for 6 h at 140 to 150° C. 10 parts by weight of water and 20 parts by weight of a trimethylsiloxy-terminated polydimethylsiloxane with a viscosity of 20 mm$^2$/s at 25° C. were then added in succession with a dropping funnel. After heating for four hours, neutralizing with acetic acid, and distilling off the volatiles, an oil was obtained with a viscosity of 4,200 mm$^2$s and an amine content of 0.27 meq/g.

EXAMPLE 2

650 parts by weight of octamethylcyclotetrasiloxane, 380 parts by weight of a silane with the formula $CH_3(C_2H_5O)_2$—Si—$C_3H_6$—$NHC_2H_4$—$NH_2$, and 40 parts by weight the formula $CH_3(C_2H_5O)_2$—Si—$C_3H_6$—NH—$C_2H_4NHC_3H_6$—Si—$(C_2H_5O)_2$—$CH_3$ were mixed with 0.9 part by weight KOH and 2.7 parts by weight ethanol, and heated for 4 h with stirring at 140 to 150° C. 102 parts by weight of water and 337 parts by weight of a trimethylsiloxy-terminated polydimethylsiloxane with a viscosity of 10 mm$^2$/s at 25° C. were then added in succession with a dropping funnel. After heating for four hours (distilling off water and ethanol), an oil was obtained with a viscosity of 243 mm$^2$/s and an amine content of 3.1 meq/g.

24 parts by weight of this reaction product was equilibrated for 8 h with 250 parts by weight of cyclic siloxanes with an average of 4 to 5 dimethylsiloxane units and 16 parts by weight of a trimethylsiloxy-terminated polydimethylsiloxane with a viscosity of 50 mm$^2$/s at 25° C. in the presence of 0.02 parts by weight of KOH. After neutralizing with acetic acid and distilling off the volatile constituents, an aminosilicone oil was obtained with a viscosity of 3,500 mm$^2$/s and an amine content of 0.25 meq/g.

EXAMPLE 3

230 parts by weight of a mixture of cyclic siloxanes with an average of 4 to 5 dimethylsiloxane units, 35 parts by weight of a silane with the formula $CH_3(CH_3O)_2$—Si—$C_2H_4CH(CH_3)$—$NHC_2H_4$—$NH_2$ and 1 part by weight of a silane with the formula $CH_3(CH_3O)_2$—Si—$C_2H_4CH(CH_3)$—$NHC_2H_4$—NH—$CH(CH_3)$—$C_2H_4$—Si—$CH_3$ $(CH_3O)_2$ were mixed with 0.5 part by weight KOH and 1.5 parts by weight water and heated for 4 hours with stirring at 140 to 150° C. 10 parts by weight of water and 140 parts by weight of a trimethylsiloxy-terminated polydimethylsiloxane with a viscosity of 350 mm$^2$/s at 25° C. were then added in succession with a dropping funnel. After heating for four hours, neutralizing with acetic acid, and distilling off the volatiles, an oil was obtained with a viscosity of 3,000 mm$^2$/s and an amine content of 0.56 meq/g.

EXAMPLE 4

500 parts by weight of a mixture of cyclic siloxanes with an average of 4 to 5 dimethylsiloxane units, 20 parts by weight of the linear fraction of the hydrolyzate of dimethyldichlorosilane, 50 parts by weight of a silane with the formula $CH_3(CH_3O)_2$—Si—$C_3H_6$—$NH_2$, and 3 parts by weight of a silane with the formula $CH_3(CH_3O)_2$—Si—$C_3H_6$—$NH_2$, and 3 parts by weight of a silane with the formula $CH_3(CH_3O)_2$—Si—$C_3H_6$—NH—$C_3H_6$—Si—$(CH_3O)_2$—$CH_3$ were mixed with 10 parts of tetrabutylphosphonium siloxanolate and heated for 10 h with stirring at 90 to 100° C. 10 parts by weight of water and 30 parts by weight of a trimethylsiloxy-terminated polydimethylsiloxane with a viscosity of 10 mm$^2$/s at 25° C. were then added in succession with a dropping funnel. After heating for four hours at 100° C., decomposing the catalyst at 170° C., and distilling off the volatiles, an oil was obtained with a viscosity of 990 mm$^2$/s and an amine content of 0.4 meq/g.

EXAMPLE 5

500 parts by weight of a mixture of cyclic siloxanes with an average of 4 to 5 dimethylsiloxane units, 50 parts by weight of the linear fraction of the hydrolyzate of dimethyldichlorosilane, 60 parts by weight of a silane with the formula $CH_3(CH_3O)_2$—Si—$C_3H_6$—$NHC_2H_4$—$NH_2$, and 6 parts by weight of a silane with the formula $CH_3(CH_3O)_2$—Si—$C_3H_6$—$NHC_2H_4$—NH—$C_3H_6$—Si—$(CH_3O)_2$—$CH_3$ were mixed with 10 parts of tetrabutylphosphonium siloxanolate and heated with stirring for 10 h at 90 to 100° C. 10 parts by weight of water and 30 parts by weight of a trimethylsiloxy-terminated polydimethylsiloxane with a viscosity of 10 mm$^2$/s at 25° C. were then added in succession with a dropping funnel. After heating for four hours at 100° C., decomposing the catalyst at 170° C., and distilling off the volatiles, an oil was obtained with a viscosity of 1300 mm$^2$/s and an amine content of 0.9 meq/g.

EXAMPLE 6

1000 parts by weight of a mixture of cyclic siloxanes with an average of 4 to 5 dimethylsiloxane units, 20 parts by weight of a silane with the formula $C_2H_5(CH_3O)_2$—Si—$C_3H_6$—$NHC_2H_4$—$NH_2$, 2 parts by weight of a silane with the formula $(CH_3O)_3$—Si—$C_3H_6$—$NHC_2H_4$—$NH_2$, and 2 parts by weight of a silane with the formula $C_2H_5(CH_3O)_2$—Si—$C_3H_6$—$NHC_2H_4$—$NHC_3H_6$—Si—$(CH_3O)_2$—$C_2H_5$ were mixed with 4.5 parts by weight of 40% aqueous KOH and heated with stirring and with nitrogen being bubbled through the mixture, for 8 h at 150° C. 200 parts by weight of water and 200 parts by weight of a trimethylsiloxy-terminated polydimethylsiloxane with a viscosity of 50 mm$^2$/s at 25° C. were then added in succession with a dropping funnel. After heating for four hours, neutralizing with acetic acid, and distilling off the volatiles, an oil was obtained with a viscosity of 7200 mm²/s and an amine content of 0.18 meq/g.

EXAMPLE 7

500 parts by weight of a mixture of cyclic siloxanes with an average of 4 to 5 dimethylsiloxane units, 100 parts by weight of a silane with the formula CH₃(C₂H₅O)₂—Si—C₃H₆—NHC₂H₄—NH—C₄H₉, and 1 part by weight of a silane with the formula CH₃(CH₃O)₂—Si—C₃H₄—NHC₂H₄—NHC₃H₆—Si—(CH₃O)₂—CH₃ were mixed with 10 parts by weight of a 20% aqueous solution of tetramethylammonium hydroxide and heated with stirring at 80° C. until no further change of viscosity occurred. 100 parts by weight of water and 200 parts by weight of a trimethylsiloxy-terminated polydimethylsiloxane with a viscosity of 20 mm²/s at 25° C. were then added in succession. After heating for six hours, decomposing the catalyst at 150° C., and distilling off the volatiles, an oil was obtained with a viscosity of 95 mm²/s and an amine content of 1.4 meq/g.

Example B: An Example of Use 18 parts by weight of the nonreactive aminosilicone oil prepared according to Example 1 was mixed with 10 parts by weight of a mixture of 5 parts by weight of a $C_{13}$ oxo alcohol with 7 ethylene oxide units and 5 parts of a $C_{9-11}$ oxo alcohol with 3 ethylene oxide units and 2 propylene oxide units, 20 parts by weight of water, and 3 parts by weight of tris(trimethylol)propane [sic]. 49 parts by weight of water was then fed in continuously over a period of 5 minutes. 0.4 part by weight of glacial acetic acid was then added. A clear, low-viscosity microemulsion was obtained with a particle size of 11 nm. When applied to cotton-polyester blended fabric, (laboratory Foulard, float with 25 g/l), this produced an outstanding soft hand.

Having now described the present invention, it will be clear to one of ordinary skill in the art that many changes and modifications may be made to the above-described embodiments without departing from the spirit and scope of the present invention.

What is claimed is:

1. A method for preparing nonreactive aminosilicone oils by base-catalyzed equilibration, which comprises:

a) reacting in a first step,
      at least one organosilicon compound having the formula (I):

wherein R independently of one another stands for univalent, saturated and/or unsaturated hydrocarbon groups with 1 to about 20 carbon atoms or aryl groups with about 6 to 20 carbon atoms, R¹ independently of one another stands for univalent alkyl groups with 1 to about 4 carbon atoms, R² independently of one another stands for saturated and/or unsaturated, substituted or unsubstituted or both, linear or cyclic hydrocarbon groups with 1 to about 30 carbon atoms or hydrogen, R³ independently of one another stands for alkyl, cycloalkyl, and/or aryl groups with 1 to about 20 carbon atoms or hydrogen or (R¹O)ₐ(R²)₃₋ₐ—Si—(CR²₂)ₘ— groups, and a stands for either 0 or 1, and in and n independently of one another assume values of 1 to 10, and p is either 0, 1, or 2, and/or its partial hydrolyzate, with at least one cyclic organosilicon compound of the formula (II):

wherein R has the meanings given above and x assumes average values between 3 and 10, in the presence of a basic catalyst and
         in the presence of at least one compound that has OH groups, with the maximum total fraction of OH groups in the first step being 75 mol-% based on the (R¹O) groups contained in the formula (I); and b) reacting a reaction mixture obtained in said first step a), in the presence of water, with at least one organosilicon compound having the formula (III)

wherein R is as defined above and z has an average value between 0 and 1,000.

2. The method of claim 1, wherein in the first step, at least one compound of the formula (IV):

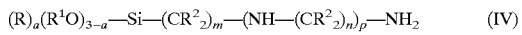

or at least one compound of the formula (V):

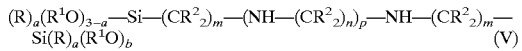

or mixtures thereof are used as the organosilicon compound.

3. The method of claim 2, wherein about 50 to 97 wt. % of the compound of the formula (IV) and about 3 to 50 wt. % of the compound of the formula (V) is used.

4. The method of claim 1, wherein in the first step, alkali metal hydroxides, alkaline earth hydroxides, tetraalkylphosphonium hydroxides, or tetraalkylammonium hydroxides or their silanolates or siloxanolates or a combination thereof are used as the basic catalyst.

5. The method of claim 1, wherein in the first step, the total fraction of OH groups based on the (R¹O) groups contained in the formula (I) is about 3 to 20 mol-%.

6. The method of claim 1, wherein in the first step, the compound having OH groups is water.

7. The method of claim 1, wherein the water is added as a solvent for the basic catalyst.

8. The method of claim 1, wherein in the first step, the compound having OH groups is an oligomeric silanol.

9. The method of claim 8, wherein the linear fraction of dimethyldichlorosilane hydrolyzate is used as the oligomeric silanol.

10. The method of claim 1, wherein in the second step, about 0.1 to 50 wt. % of water is used, based on the reaction mixture from the first step.

11. The method of claim 1, wherein in the first step, a mixture of at least one compound with the formula (IV):

and at least one compound with the formula (V):

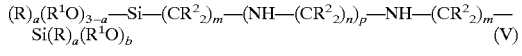

is reacted with at least one cyclic organosilicon compound with the formula (II):

in the presence of a basic catalyst, and the reaction mixture obtained, in a second step, is reacted with 0.1 to 50 wt. % water based on the reaction mixture from the first step, and at least one organosilicon compound with the formula (III):

$$R_3SiO(SiR_2)_zSiR_3 \quad (III),$$

wherein R is as defined above, and z has a value between 0 and 200, wherein the groups R and $R^1$ each independently represent methyl or ethyl groups, and the groups $R^2$ each independently represent methyl groups or hydrogen.

* * * * *